United States Patent Office 3,122,522
Patented Feb. 25, 1964

3,122,522
ONE-COMPONENT ROOM TEMPERATURE CURING SYSTEM EMPLOYING NEW SILICONE INTERMEDIATES
Paul L. Brown, Saginaw, and James Franklin Hyde, Midland, Mich., assignors to Dow Corning Corporation, Midland, Mich., a corporation of Michigan
No Drawing. Filed Oct. 16, 1961, Ser. No. 145,441
7 Claims. (Cl. 260—46.5)

This invention relates to new organopolysiloxane intermediates containing silicon-bonded cellosolvoxyl type radicals as essentially the only condensable groups and a mixture of these new intermediates with a condensation catalyst which is active at room temperature to form a fluid system which is stable in the absence of moisture but which cures to a solid at room temperature in the presence of atmospheric moisture.

The desirability of room temperature curing systems is now well established. Resinous systems are used primarily in coating applications such as in wood lacquers. Elastomeric systems are used both in coating applications and in caulking applications. The first room temperature curing systems involved two or more stable components which when mixed together cured spontaneously to some desired solid material. Such systems could not be marketed as one component systems due to their spontaneous interaction resulting in curing the system to a solid, unworkable state.

Subsequently, it was found that certain fluid organopolysiloxanes containing silicon-bonded acyloxyl radicals as the only reactive groups were stable in the absence of moisture but cured in the presence of moisture to resinous or elastomeric solids depending on the organopolysiloxane structure and composition. The curing of this one-component system is accompanied by the evolution of a carboxylic acid, generally acetic acid with present commercial materials. This one-component system has been a great commercial success. However, there are some applications in which the presence of the carboxylic acid produced by this system is undesirable and detrimental. The desirability of a commercially competitive product having universal application has made more urgent the perfection of other possible one-component room temperature curing organopolysiloxane systems.

The discovery of a new class of organopolysiloxane intermediates has made possible the preparation of a new one-component room temperature curing system employing a catalyst. The characteristics of the final cured product can be widely varied by variation in the composition and structure of the intermediate employed. Furthermore, the intermediate can be prepared in situ while preparing the desired room temperature curing system.

The primary object of this invention is to provide a new one-component room temperature curing organopolysiloxane system which is stable in the absence of moisture. Another object is to provide such a system which is free of acid. Another object is to provide a new class of organopolysiloxane intermediates suitable for use in the new system. Another object is to provide a method for preparing the intermediates as well as a method for preparing the mixture employed in the new system wherein the intermediates employed is prepared in situ.

The new class of organopolysiloxane intermediates of this invention is defined as a siloxane composition each molecule of which consists esesntially of (1) at least two units of the formula

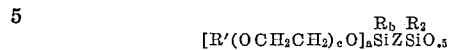

and (2) units of the formula

in which each R and each R' is independently selected from the group consisting of monovalent hydrocarbon radicals and halogenated monovalent hydrocarbon radicals, each $a$ has a value ranging from 2 to 3, each $b$ has a value ranging from 0 to 1, the sum of $a$ and $b$ in any unit (1) is no greater than 3, each $c$ has a value ranging from 1 to 3, each $d$ has a value ranging from 0 to 2, and Z is a divalent hydrocarbon radical of from 2 to 18 inclusive carbon atoms and being free of aliphatic unsaturation, there being in each molecule of the ultimate siloxane composition units of (1) and (2) such that there is an average of from 1.3 to 2.0 R groups per silicon atom and that there is at least seven units of (2) per molecule.

In the intermediates of this invention each R and each R' can be any monovalent hydrocarbon radical or any halogenated monovalent hydrocarbon radical. More specifically R and R' can be, for example, any alkyl radical such as the methyl, ethyl, isopropyl, tert-butyl, 2-ethylhexyl, dodecyl, 1-isobutyl-3,5-dimethylhexyl, octadecyl and myricyl radicals; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can be halogenated to give such radicals as the chloromethyl, 3,3,3-trifluoropropyl, 3,3,4,4,5,5,5-heptafluoropentyl, perchlorophenyl, 3,4-dibromocyclohexyl, $\alpha,\alpha,\alpha$-trifluorotolyl, 2,4-dibromobenzyl, difluoromonochlorovinyl, $\alpha,\beta,\beta$-trifluoro-$\alpha$-chlorocyclobutyl and 2-iodocyclopenten-3-yl radicals, all of which are operative. Preferably, R is a methyl, vinyl, phenyl or 3,3,3-trifluoropropyl radical and R' is an aliphatic monovalent hydrocarbon radical.

In the intermediates of this invention the reactive cellosolvoxyl type groups [R'(OCH$_2$CH$_2$)$_c$O]— can be for example, the CH$_3$CH$_2$CH$_2$CH$_2$OCH$_2$CH$_2$O—
CH$_3$CH$_2$CH$_2$CH$_2$(OCH$_2$CH$_2$)$_2$O—
CH$_2$=CHCH$_2$OCH$_2$CH$_2$O—, CH$_3$CH$_2$OCH$_2$CH$_2$O—
CH$_3$CH$_2$(OCH$_2$CH$_2$)$_2$O—, CH$_3$CH$_2$(OCH$_2$CH$_2$)$_3$O—
CH$_3$OCH$_2$CH$_2$O—, C$_6$H$_5$OCH$_2$CH$_2$O—
ClCH$_2$CH$_2$OCH$_2$CH$_2$O— and CF$_3$OCH$_2$CH$_2$O— radicals. However, R' is preferably an aliphatic monovalent hydrocarbon radical of less than about five carbon atoms.

The intermediates of this invention can have a variety of structures such as, for example:

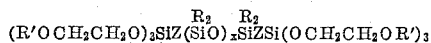

$(R'OCH_2CH_2O)_2SiZ(SiO)_xSiZSiR(OCH_2CH_2OR')_2$ with R, R_2, R_2 substituents $(R'OCH_2CH_2O)_2SiZ(SiO)_xSiZSi(OCH_2CH_2OR')_3$ with R, R_2, R_2 substituents $[(R'OCH_2CH_2O)_2SiZ(SiO)_x]_4Si$ with R_2, R_2 substituents $[(R'OCH_2CH_2O)_2SiZ(SiO)_xSiO]_y(SiO)_z[ZSi(OCH_2CH_2OR')_2]_2$ with R_2, R_2, R, R_2, R substituents and $[(R'OCH_2CH_2O)_3SiZ]_y(SiO)_x(SiO_2)_z[ZSi(OCH_2CH_2OR')_2]_w$ with R_2, R_2 substituents in which each R and each R' as defined above can be the same as or different as any other R or R' and each w, x, y and z are positive integers such that there is an average of from 1.3 to 2.0 R groups per silicon atom.

The siloxanes of this invention are best prepared by reacting siloxanes containing SiH groups with silanes of the formula $[R'(OCH_2CH_2)_cO]_aSiR''_b$ in which R" is a monovalent hydrocarbon radical containing an aliphatic or cycloaliphatic C=C group. This reaction is best carried out in the presence of a Pt catalyst such as chloroplatinic acid, platinum on charcoal or platinum on alumina. The reaction proceeds at temperatures ranging from 30° to 150° C. by way of the addition of the SiH to the C=C group. This addition produces the divalent Z radical.

Alternatively one can react siloxanes containing SiR" groups with silanes of the formula $HSi[O(CH_2CH_2O)_cR']_a R_b$ This reaction proceeds under the same conditions shown above.

The starting silanes and siloxanes employed herein can be prepared by the conventional techniques for preparing SiH containing silanes and siloxanes and for preparing unsaturated hydrocarbon containing silanes and siloxanes.

For the purpose of this invention Z can be any divalent hydrocarbon radical free of aliphatic unsaturation such as —CH_2CH_2—, —CH— with Me substituent —CH_2CH_2CH_2—, —CHMeCH_2—, —CHMeCH_2CH_2—, —CHEtCH_2—

—⟨S⟩— (thiophene ring)

—CHMe(CH_2)_4—

CHEtCH_2CH— with Me substituent, —⟨ ⟩—CH_2CH_2— (phenylene)

—⟨ ⟩—CHMeCH_2—, —CH_2CH_2—⟨S⟩—

—(CH_2)_{18}—, —CHC_6H_5CH_2—

—CHMe(CH_2)_3C— with Me_2 substituent

—CH_2CH_2CHMeCH_2CH_2CH_2CHMeCH_2—

—CH_2CH_2—⟨ ⟩—CH_2CH_2— and —(CH_2)_9CH(C_8H_{17})—. In the formulae Me and Et represent methyl and ethyl respectively.

The siloxanes of this invention can be used as one component room temperature curing resins and rubbers which are useful as coating compositions, sealants and electrical insulation. In order to make rubbery products the preferred configuration for the siloxane is $[R'(OCH_2CH_2)_cO]_aSiZ[SiO]_xSiZSi[O(CH_2CH_2O)_cR']_a$ with R_b, R_2, R_2, R_b substituents The siloxanes of this invention can be caused to cure by mixing them with a condensation catalyst and thereafter exposing the mixture to moisture. Any catalyst which promotes the condensation of silicon-bonded OH groups or water with silicon-bonded —O(CH_2CH_2O)_cR' groups can be employed herein.

Typical classes of such condensation catalysts include, for example, certain organic amines, phosphoric acid salts of any basic amino compounds, carboxylic acid salts of any basic amino compound, carboxylic acid salts of any quaternary ammonium hydroxide and carboxylic acid salts of any metal ranging from lead to manganese inclusive in the electromotive series of metals.

The organic amines employed as a catalyst in the room temperature curing system of this invention must have a basic dissociation constant in dilute solution in water of at least $10^{-7}$ at 25° C. Thus, the amino compound can be, for example, a primary amine, a secondary amine, a tertiary amine or any combination of these. Examples of operative amines include the following: sec-butylamine, diethylbenzylamine, diethylamine, diisoamylamine, diisobutylamine, dimethylamine, dimethylaminomethylphenol, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, n-propylamine, t-octadecylamine, quinine, tetramethylenediamine, tetramethylquanidine, triethylamine, triisobutylamine, trimethylamine, trimethylenediamine, tripropylamine, L-arginine, L-lysine, aconitine, benzylamine, cinchonidine, codeine, coniine, emetine, ethanolamine, o-methoxybenzylamine, m-methoxybenzylamine, p-methoxybenzylamine, N,N-methoxybenzylamine, o-methylbenzylamine, m-methylbenzylamine, p-methylbenzylamine, N,N-methylbenzylamine, morphine, nicotine, novocain base, epsilonphenylamylamine, delta-phenylbutylamine, β-phenylethylamine, β-phenylethylmethylamine, gamma-phenylpropylamine, N,N-isopropylbenzylamine, physostigmine, piperazine, quinidine, solamine, sparteine, thebaine, t-butyl - 2,4 - dinitrophenylamine, t-butyl-2-hydroxy - 5 - nitrobenzylamine, t-butyl - 4-isonitrosoamylamine, t-octylamylamine, t-octyl-2-(β-butoxyethoxy)ethylamine, 2,4,6-tris(dimethylamino)phenol, and veratrine. Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine, formaldehyde and heptylamine. The preferred organic amines are aminohydrocarbons, i.e. hydrocarbons in which the only functional atoms are amine nitrogen atoms. It is also generally desirable that the amine employed be comparatively non-volatile at room temperature.

Also operative as condensation catalysts are such materials as the disiloxanes of the formula $O[Si(CH_3)_2(CH_2)_nNH_2]_2$ disclosed in U.S. Patent 2,557,803 and silanes of the formula $[PhMe_2Si(CH_2)_n]_2CHNH_a$ and $[Me_3Si(CH_2)_n]_2CHNH_2$ disclosed in U.S. Patent 2,662,909.

The condensation catalyst can also be a reaction product of a basic amino compound, i.e. ammonia or organic amines (including silylorganic amines), with phosphoric acids or carboxylic acids.

More specifically, the basic amino compound can be ammonia, a primary amine, a secondary amine or a tertiary amine. The amine can contain one or more amino groups and can also contain carbon-bonded silicon atoms and other functional organic groups which are free of active hydrogen. It is necessary that the only active hydrogen atoms, if any, be attached to nitrogen atoms. An "active hydrogen" atom is one which forms methane when a compound containing said "active hydrogen" is reacted with methyl magnesium iodide at room temperature. Any other active hydrogen atoms interfere with the salt formation. The amino compound can, however, contain various non-interfering functional groups as shown in the following examples.

In short the term "basic amino compound" means compounds containing at least one nitrogen atom attached to no more than three carbon atoms none of which are double-bonded to oxygen, sulfur or phosphorus atoms.

Specific examples of amines operative in the preparation of suitable salts are: o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym - bis - gamma - aminopropyl - tetramethyldisiloxane, gamma(N - aminoethylamino)propyldiphenylmethylsilane, o-iodoaniline, o-nitroaniline, 2,3,4,5-tetrachloroaniline, o-anisidine, 9-anthrylamine, 4,4'-diaminoazobenzene, anthranilonitrile, benzylamino, p-methoxybenzylamine, decylamine, diallylamine, dicyclohexylamine, diethylenetriamine, difurfurylamine, di-m-tolylamine, β-ethoxyethylamine, tetrahydrofurfurylamine, histamine, benzylhydrazine, p-bromophenylhydrazine, 1-methyl-1-phenylhydrazine, 4,4'-diaminohydrazobenzene, P₃-leucaniline, methylamine, morpholine, 5-nitronaphthylamine, 1,2-dimethyl-4-pentenylamine, N,N-diethyl-p-phenylenediamine, piperazine, piperidine, 2-aminopyridine, 6-nitro-o-toluidine, 2-amino-p-tolunitrile, 9-phenanthrylamine and tribenzylamine.

As stated above the salts which are operative catalysts in this invention are the reaction products of any of the basic amino compounds described above, i.e. ammonia and primary, secondary and tertiary amines, both organic and silylorganic, with either a phosphoric acid or a carboxylic acid in which any carboxyl group is attached to a carbon atom. As in the basic amino compounds where any active hydrogen atoms are attached to nitrogen atoms, so in the acids any active hydrogen atoms must be a part of the particular acid group, e.g. RCOOH, O=P(OH)₃ or

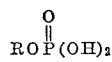

The salts employed in any particular system must be compatible in that system. The degree of compatibility of any salt in any system generally depends on the total number of carbon atoms and silicon atoms and their configuration in the salt to be employed. Thus, for example, in a given system the n-hexylamine salt of octanoic acid is compatible while the di-n-hexylamine salt of succinic acid is incompatible. However, the di-eicosylamine salt of succinic acid is compatible in that system. Similarly, the mono-2-ethylhexyl amine salt of phenylphosphoric acid is compatible in a given system whereas it is necessary to go to the mono-eicosylamine salt of unsubstituted phosphoric acid to achieve compatibility in the same system. For any particular system suitable salts can be selected on the basis of compatibility.

The most compatible and therefore preferred salts are monocarboxylic acid salts which have at least six carbon atoms. Examples of the monocarboxylic acid which can be used in the preparation of these salts include the following: abietic acid, acetic acid, cyanoacetic acid, phenoxyacetic acid, acrylic acid, β-benzoylacrylic acid, angelic acid, anisic acid, N-acetylanthranilic acid, arachidic acid, atropic acid, benzoic acid, o-bromobenzoic acid, p-cyanobenzoic acid, 2,6-dichlorobenzoic acid, 2,5-dinitrobenzoic acid, m-fluoro-benzoic acid, brassidic acid, dl-campholic acid, capric acid, cinnamic acid, cyclohexanecarboxylic acid, cyclopropanecarboxylic acid, formic acid, 3-furancarboxylic acid, trimethylsilylacetic acid, 5-nitro-2-furoic acid, 10-hendecenoic acid, isobutyric acid, lauric acid, levulinic acid, lignoceric acid, linoleic acid, oleic acid, stearic acid, tetrahydropyromucic acid, 3-ethylpentanoic acid and 2,4-xylic acid.

Polycarboxylic acids while not preferred can also be employed in preparing the amine salts operative in this invention. Examples of such acids include: adipic acid, azelaic acid, o-carboxylmethoxybenzoic acid, 1-camphoric acid, 1,2-cyclobutanedicarboxylic acid, sym-bis-β-carboxyethyltetramethyldisiloxane, 1,2,3,4,5,6 - cyclohexanehexacarboxylic acid, 1,3 - cyclopentanedicarboxylic acid, diphenic acid, ethylmalonic acid, pimelic acid, sebacic acid, succinic acid and traumatic acid. It requires more carbon atoms in an amine salt of a polycarboxylic acid to render it compatible with the siloxane component of this invention than is the case with an amine salt of a monocarboxylic acid. For instance, in a given system n-hexylamine 2-ethylhexoate is very compatible and active whereas bis-eicosylamine succinate containing over three times as many carbon atoms is still less compatible and therefore less active. This problem can generally be somewhat alleviated by the use of silylorganic amine salts of these acids.

This problem of compatibility also arises with the amine salts of phosphoric acids which are also operative as catalysts in this invention. The salt can be prepared with phosphoric acid or with any acid esters of phosphoric acid such as monovalent hydrocarbon substituted phosphoric acids, e.g. phenylphosphoric, monooctadecylphosphoric or diethylphosphoric acids. An organic amine salt of phosphoric acid preferably contains at least about 18 carbon atoms to make it sufficiently compatible in a siloxane to be active whereas a silylorganic amine salt may not require so much carbon to render it compatible depending on the solubility characteristics of the system.

The amine-type salts are prepared by reacting ammonia, an organic amine or an aminoorganosilicon compound with a phosphoric or carboxylic acid. This can be accomplished by merely mixing the components alone in a relatively anhydrous system or by mixing the components together in a common solvent. This preparation is well known.

The amine-type salts can be normal, acidic or basic. The normal salts are those in which there are no unreacted amine or acid groups present as, for example, in

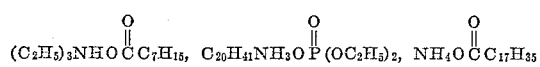

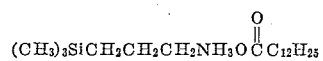

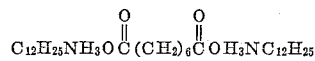

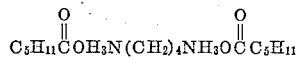

and

Actually, the normal salts will often be acidic or basic depending on the relative basic and acidic characteristics of the amine and acid used to form the salt. This acidity or basicity can be balanced by adding an excess of the necessary amine or acid. The acidic salts are those in which there are unreacted acid groups present as, for example, in

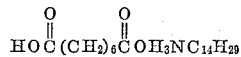

and

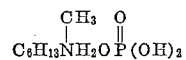

The basic salts are those in which there are unreacted amino groups present as, for example in

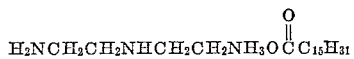

Further examples of amine salts operative as condensation catalyst in this invention include: di-2-ethylhexylamine acetate, triphenylsilpropylamine formate, trimethylsiloxydimethylsilhexylamine hexoate, 4,4'-diaminobenzophenone butyrate, 4,4'-diamino diphenyl ether decanoate, tri-n-butylamine acrylate, 3,4-dichloroaniline caproate, aniline octanoate, didodecylamine o-chlorophenoxyacetate, ethylamine 3-ethoxypropionate, diethylene triamine monooleate, diisopropylamine palmitate, trimethylamine stearate, benzylhydrazine hexoate, 2,5-dimethylpiperazine octoate, di(octadecylamine)sebacate, ethylenediamine di-hexoate, tetraethylene pentamine diphosphate, 1,2-aminopropane phenylphosphate and ammonium stearate together with the salts of any other of the amines and acids shown above. These examples are by no means complete, but they do illustrate some of the types of amine-type salts which can be used.

The condensation catalyst can also be a carboxylic acid salt of a quaternary ammonium hydroxide such as tetramethylammonium 2-ethylhexoate, benzyltrimethylammonium acetate or phenyltrimethylammonium 2-ethylhexoate.

The condensation catalyst can also be, for example, a carboxylic acid salt of a metal ranging from lead to manganese in the electromotive series of metals. Specifically, the metals included are lead, tin, nickel, cobalt, iron, cadmium, chromium, zinc and manganese. The term "carboxylic acid salt" as employed herein includes those salts which contain hydrocarbon radicals attached to the metal, for example, dibutyl tin diacetate.

Specific examples of salts which are operative in this invention are the naphthenates of the above metals such as lead naphthenate, cobalt naphthenate and zinc naphthenate, salts of fatty acids such as iron 2-ethylhexoate, lead 2-ethylhexoate, dibutyltin dilaurate and chromium octoate, salts of aromatic carboxylic acids such as dibutyltin dibenzoate, salts of polycarboxylic acids such as dibutyltin adipate and lead sebacate and salts of hydroxy carboxylic acids such as dibutyltin dilactate.

For the above metal carboxylates to be effective it is necessary that they be at least somewhat compatible in the siloxane employed. This compatibility is enhanced by the use of carboxylic acids containing more than about six carbon atoms in the preparation of the salts.

The condensation catalyst must be sufficiently compatible in the siloxane employed in this invention to be evenly dispsered therein. Generally, at least 0.01 part by weight of catalyst per 100 parts of siloxane is required to effect curing. There is no critical maximum although usually more than 10 parts by weight of catalyst per 100 parts of A is wasteful. The preferred range for maximum catalyst efficiency is on the average from 0.1 to 5 parts by weight of catalyst per 100 parts of siloxane for the catalyst classes illustrated. However, these ranges of proportions may well vary with other catalysts which though not specifically disclosed herein are included within the scope of this invention as catalysts which promote the condensation of silicon-bonded hydroxyl groups with silicon-bonded alkoxyl groups at room temperature.

The operativity of any compound as a catalyst can most easily be determined by thoroughly mixing together 100 parts by weight of a hydroxyl-endblocked diorganopolysiloxane having a viscosity at 25° C. of about 10,000 cs., about 5 parts by weight of an alkoxylated silicate, e.g. ethylpolysilicate, and about 2 parts by weight of the proposed catalyst and allowing the system to stand for at least 24 hours. If the system has gelled, the proposed catalyst is in fact a catalyst for that system and therefore an operative catalyst in the room temperature curing systems of this invention.

When any polyfunctional intermediate of this invention is mixed with a suitable condensation catalyst and the mixture is kept moisture free as in a waterproof package, the mixture is stable, i.e. it does not change. However, when the mixture is exposed to atmospheric moisture, the viscosity of the mixture gradually increases followed by gelation and cure.

Pigments, heat stability additives, fillers, perfumes, plasticizers and other relatively inert additives can be mixed with the intermediates of this invention if desired.

The following examples are merely illustrative and are not intended to limit this invention, the scope of which is properly delineated in the claims. All viscosities are measured at 25° C.

EXAMPLE 1

60 g. of a 4800 cps. siloxane of the formula

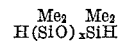

was dissolved in 200 cc. of xylene and 2.24 g. of

was added along with 2 drops of a solution of chlorplatinic acid in dimethyl phthalate containing one percent by weight platinum. The mixture was refluxed for 24 hours. The solvent was removed and there was obtained a fluid siloxane of the formula

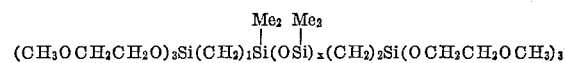

A sample of this fluid was catalyzed with one drop of di-n-hexylamine, the material was stable in the absence of moisture but cured on the exposure to air to a rubbery gel.

EXAMPLE 2

When each of the following compounds is substituted for the di-n-hexylamine in Example 1, the resulting compound in each case behaves in the same manner as shown in Example 1.

Lead naphthenate
Cobalt octoate
Dibutyltin dibenzoate
Dibutyltin dilaurate
n-Hexylamine
Ethylenediamine
N-methylbutylamine
Benzylamine
Piperazine
The condensation product of formaldehyde and methylamine
n-Hexylamine octoate
Di-2-ethylhexylamine acetate
Triphenylsilpropylamine formate
Trimethylamine stearate
Ethylene diamine di-hexoate
Ammonium stearate
1,2-aminopropane phenylphosphate
Eicosylamine phosphate
Benzyltrimethylammonium acetate
Tetramethylammonium acetate
Tetrapropyltitanate

EXAMPLE 3

When the following silanes are reacted with the following siloxanes at 125° C. in the presence of the catalyst of Example 1, the following compounds are obtained.

Table I

| Siloxane | Silane | Compound |
|---|---|---|
| $HSi(OSi)_{5000}SiH$ with $Me_2$ groups | $CH_2=CHCH_2Si[O(CH_2CH_2O)_2Et]_2$ with Me | $[Et(OCH_2CH_2)_2O]_2Si(CH_2)_3Si[OSi]_{5000}(CH_2)_3$ with Me, $Me_2$, $Me_2$ groups, and $Si[O(CH_2CH_2O)_2Et]_2$ with Me |
| $Si[(OSi)_{10}SiH]_3$ with Me, $Me_2$, $Me_2$ | $CH_2=CH\text{-}C_6H_4\text{-}Si[O(CH_2CH_2O)_3C_4H_9]_3$ | $Si\{(OSi)_{10}SiCH_2CH_2\text{-}C_6H_4\text{-}Si[O(CH_2CH_2O)_3C_4H_9]_3\}_3$ with Me, $Me_2$, $Me_2$ |
| $Si[(OSi)_{20}SiH]_4$ with $Me_2$, $Me_2$ | $C_6H_{10}\text{-}Si(OCH_2CH_2OMe)_3$ | $Si[(OSi)_{20}OSi\text{-}C_6H_{10}\text{-}Si(OCH_2CH_2OMe)_3]_4$ with $Me_2$, $Me_2$ |
| $Si[(OSi)_{100}H]_2$ with $C_6H_5$, Me / $C_6H_5$, Me | $CH_2=CH(C_{16}H_{32})Si(OCH_2CH_2OMe)_3$ | $Si[(OSi)_{100}(C_{18}H_{36})Si(OCH_2CH_2OMe)_3]_2$ with $C_6H_5$, Me / $C_6H_5$, Me |
| $Si[(OSi)_{40}H]_2$ with $CF_3CH_2CH_2$, Me substituents | $CH_2=CCH_2Si(OCH_2CH_2OCH_2CF_3)_3$ with Me | $Si[(OSi)_{40}CH_2CHCH_2Si(OCH_2CH_2OCH_2CF_3)_3]_2$ with $CF_3CH_2CH_2$, Me, Me |
| $HSi[(OSi)_3(OSi)_{20}]OSiH$ with $Me_2$, $Et_2$, $C_2H_3$, Me, $Me_2$ | $CH_2=CHSi(OCH_2CH_2OMe)_2$ with $C_6H_5$ | $(MeOCH_2CH_2O)_2Si(CH_2)_2Si[(OSi)_3(OSi)_{20}]$ ... with $C_6H_5$, $Me_2$, $Et_2$, $C_2H_3$, Me, and $OSi(CH_2)_2Si(OCH_2CH_2OMe)_2$ with $Me_2$, $C_6H_5$ |
| $Si[(OSi)_{30}H]_2$ with Cl-aryl, $Me_2$, Me | $CH_2=CHSi(OCH_2CH_2O\text{-}C_6H_{10}\text{-})_3$ | $Si[(OSi)_{30}(CH_2)_2Si(OCH_2CH_2O\text{-}C_6H_{10}\text{-})_3]_2$ with Cl-aryl, $Me_2$, Me |
| $Si[(OSi)_{10}OSiH]_2$ with $C_{18}H_{37}$, Me / $C_{18}H_{37}$, $Me_2$ | $CH_2=CHSi(OCH_2CH_2OMe)_2$ with $C_{18}H_{37}$ | $Si[(OSi)_{10}OSiCH_2CH_2Si(OCH_2CH_2OMe)_2]_2$ with $C_{18}H_{37}$, Me / $C_{18}H_{37}$ Me / $C_{18}H_{37}$ |
| $Si[(OSi)_{15}OSiH]_2$ with Br-thienyl, Me / Br-thienyl, Me, $C_2H_5$ | $CH_2=CH_2Si(OCH_2CH_2O\text{-}C_6H_{10}\text{-})_3$ | $Si[(OSi)_{15}OSiCH_2CH_2Si(OCH_2CH_2O\text{-}C_6H_{10}\text{-})_3]_2$ with Br-thienyl, Me / Br-thienyl, Me, $C_2H_5$ |

When the above compounds are mixed with dibutyltin-dilaurate and exposed to moisture the materials will cure at room temperature. The mixture of compound and catalyst is stable in the absence of moisture.

That which is claimed is:

1. A siloxane composition each molecule of which consists essentially of (1) at least two units of the formula of

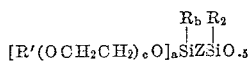

and (2) units of the formula

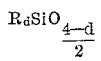

in which each R and R' is independently selected from the group consisting of monovalent hydrocarbon radicals and halogenated monovalent hydrocarbon radicals, each $a$ has a value ranging from 2 to 3, each $b$ has a value ranging from 0 to 1 in the sum of $a+b$ in any units (1) being no greater than 3, each $c$ has a value ranging from 1 to 2, each $d$ has a value ranging from 0 to 2 and Z is a divalent hydrocarbon radical of from 2 to 18 inclusive carbon atoms, Z being free of aliphatic unsaturation, there being in each molecule of the ultimate siloxane composition units of (1) and (2) such that there is an average of from 1.3 to 2 R groups per silicon atom and that there are at least seven units of (2) per molecule.

2. A composition in accordance with claim 1 in which R and R' are methyl radicals and Z is an ethylene radical.

3. A composition of the average formula

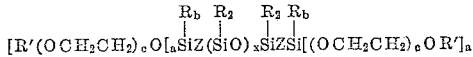

in which each R and R' is selected from the group consisting of monovalent hydrocarbon radicals and halogenated monovalent hydrocarbon radicals, each $c$ has a value ranging from 1 to 3, $x$ is a positive integer of at least 7, $b$ has a value from 0 to 1, $a$ has a value from 2 to 3 and the sum of $a+b$ is not greater than 3 and Z is a divalent hydrocarbon radical of from 2 to 18 inclusive carbon atoms, Z being free of aliphatic unsaturation.

4. A room temperature curing composition which is stable in the absence of moisture, but which cures in the presence of moisture comprising a composition of claim 1 and a condensation catalyst for the siloxane.

5. A composition capable of curing to a rubbery material in the presence of moisture but which is stable in the absence of moisture comprising the siloxane of claim 3 and a condensation catalyst for said siloxane.

6. A method of preparing a cured siloxane composition which comprises exposing the composition of claim 4 to moisture.

7. A method of preparing a siloxane rubber which comprises exposing the composition of claim 5 to moisture.

References Cited in the file of this patent
UNITED STATES PATENTS

| | | |
|---|---|---|
| 2,868,824 | Haluska | Jan. 13, 1959 |
| 2,902,467 | Chipman | Sept. 1, 1959 |
| 3,081,269 | Shannon et al. | Mar. 12, 1963 |

UNITED STATES PATENT OFFICE
CERTIFICATE OF CORRECTION

Patent No. 3,122,522                            February 25, 1964

Paul L. Brown et al.

It is hereby certified that error appears in the above numbered patent requiring correction and that the said Letters Patent should read as corrected below.

Column 3, lines 72 and 73, the formula should appear as shown below instead of as in the patent:

column 8, lines 35 and 36, the formula should appear as shown below instead of as in the patent:

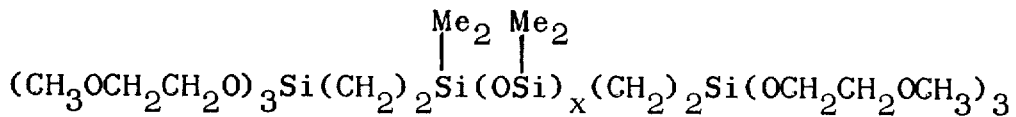

column 10, lines 61 and 62, the formula should appear as shown below instead of as in the patent:

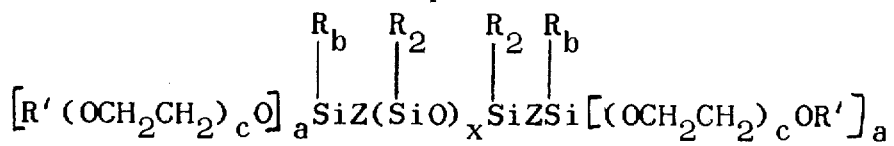

Signed and sealed this 9th day of March 1965.

(SEAL)
Attest:

ERNEST W. SWIDER                            EDWARD J. BRENNER
Attesting Officer                            Commissioner of Patents